US012619386B2

(12) United States Patent
Honda

(10) Patent No.: US 12,619,386 B2
(45) Date of Patent: May 5, 2026

(54) INFORMATION PROCESSING DEVICE, IMAGE FORMING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Koichiro Honda, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/184,763

(22) Filed: Mar. 16, 2023

(65) Prior Publication Data

US 2024/0078055 A1 Mar. 7, 2024

(30) Foreign Application Priority Data

Sep. 5, 2022 (JP) .................................. 2022-140766

(51) Int. Cl.
*G06F 3/12* (2006.01)

(52) U.S. Cl.
CPC .......... *G06F 3/1204* (2013.01); *G06F 3/1254* (2013.01)

(58) Field of Classification Search
None
See application file for complete search history.

(56) References Cited

U.S. PATENT DOCUMENTS

| | | | | |
|---|---|---|---|---|
| 6,412,897 B1 * | 7/2002 | Konishi | ................. | B41J 15/044 |
| | | | | 347/14 |
| 7,796,295 B2 * | 9/2010 | Kudo | ................. | H04N 1/32112 |
| | | | | 358/1.9 |
| 2014/0370819 A1 * | 12/2014 | Asai | ....................... | G06F 3/1236 |
| | | | | 455/41.3 |
| 2019/0391766 A1 * | 12/2019 | Morita | ............... | H04N 1/00456 |
| 2024/0036774 A1 * | 2/2024 | Chen | ....................... | G06F 3/126 |

FOREIGN PATENT DOCUMENTS

JP 2005-070877 A 3/2005

* cited by examiner

*Primary Examiner* — Helen Zong
(74) *Attorney, Agent, or Firm* — Oliff PLC

(57) ABSTRACT

An information processing device includes at least one processor, the processor configured to: accept a user's specification of one item of setup information from among plural items of setup information associated with a recording medium and a print setup item; in a case where there is preferred setup information that is another item of setup information associated with a same recording medium as a recording medium associated with the specified setup information, and that has a higher preference than the specified setup information, accept necessity or lack thereof to use the preferred setup information; and, upon acceptance of use of the preferred setup information, output print data to which the preferred setup information is applied.

14 Claims, 6 Drawing Sheets

INFORMATION PROCESSING DEVICE, IMAGE FORMING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-140766 filed Sep. 5, 2022.

BACKGROUND

(i) Technical Field

The present disclosure relates to an information processing device, an image forming apparatus, a non-transitory computer readable medium, and an information processing method.

(ii) Related Art

Japanese Unexamined Patent Application Publication No. 2005-070877 discloses a data processing apparatus capable of outputting print data to a printer equipped with a detector configured to detect characteristics of a recording medium. The data processing apparatus includes: a first memory configured to store, for each recording medium or group, a print profile for properly outputting print data generated for each recording medium; a print data generator configured to generate optimal print data for each recording medium or for each group by selecting any of print profiles stored in the first memory; a second memory configured to store determination information for determining a type of characteristic information detected by the detector, obtained from the printer; a determination unit configured to determine a type of the recording medium based on characteristic information obtained from the printer and determination information stored in the second memory; a recording medium selector configured to select a type of recording medium; a use log memory configured to store a use log of the recording medium selected by the selector; and a profile management unit configured to optimize and manage a print profile to be selected by the print data generator upon group determination, from the use log of the recording medium selected by the selector, stored in the use log memory, and the type of the recording medium determined by the determination unit.

SUMMARY

Aspects of non-limiting embodiments of the present disclosure relate to providing an information processing device, an image forming apparatus, a non-transitory computer readable medium, and an information processing method enabling printing using setup information having a higher preference than setup information specified by a user in the case where there is a large amount of setup information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including at least one processor, the processor configured to: accept a user's specification of one item of setup information from among a plurality of items of setup information associated with a recording medium and a print setup item; in a case where there is preferred setup information that is another item of setup information associated with a same recording medium as a recording medium associated with the specified setup information, and that has a higher preference than the specified setup information, accept necessity or lack thereof to use the preferred setup information; and, upon acceptance of use of the preferred setup information, output print data to which the preferred setup information is applied.

BRIEF DESCRIPTION OF THE DRAWINGS

An exemplary embodiment of the present disclosure will be described in detail based on the following figures, wherein.

DETAILED DESCRIPTION

Figure 1:
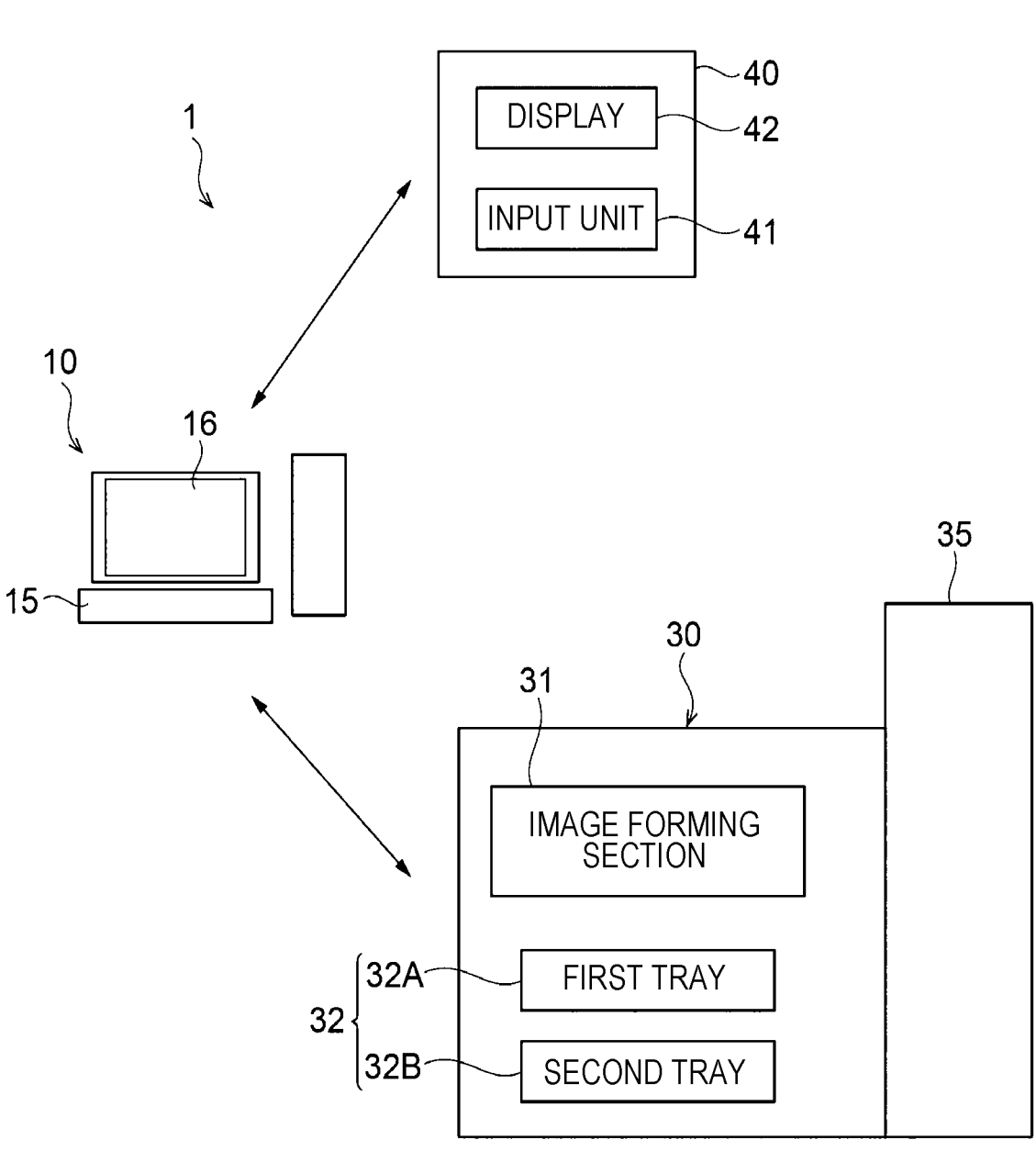
FIG. 1 is a diagram illustrating a specific configuration of an information processing system including a user terminal according to a first exemplary embodiment.

Hereinafter, an exemplary embodiment of the technology of the present disclosure will be described with reference to the drawings. Note that the same reference numerals are assigned to the same or equivalent components and parts in the drawings. In addition, the dimensional ratios in the drawings are exaggerated for the convenience of explanation and may differ from the actual ratios.

First Exemplary Embodiment

FIG. 1 is a diagram illustrating a schematic configuration of an information processing system including an information processing device according to a first exemplary embodiment.

As illustrated in FIG. 1, an information processing system 1 includes a user terminal 10 as an example of an information processing device, an image forming apparatus 30, and an external device 40. In the information processing system 1, the user terminal 10 and the image forming apparatus 30 are connected via the Internet or a wired or wireless network. Moreover, in the information processing system 1, the user terminal 10 and the external device 40 are connected via the Internet or a wired or wireless network. In FIG. 1, the information processing system 1 is illustrated as a system connected via a wireless network, for example. Note that, although omitted in the drawings, the user terminal 10 and the external device 40 may be connected via a server.

The user terminal 10 is a device configured to create and edit a media file as an example of setup information and to give a print instruction. The user terminal 10 is, for example, a personal computer (PC) used by a client as an example of a user.

The user terminal 10 includes an input unit 15 and a display 16. The user terminal 10 creates, for example, a media file (such as a media file 211A illustrated in FIG. 4) using the input unit 15, and an image based on the media file (such as the media file 211A) is displayed on the display 16. A media file refers to an example of setup information with which paper information 221, which is information on paper as an example of a recording medium, and print setup items 222 are associated (see FIG. 4). For example, using a print instruction, the user terminal 10 outputs print data to which a media file (such as the media file 211A) is applied to the image forming apparatus 30, thereby executing printing on paper by the image forming apparatus 30. A specific configuration and operation of the user terminal 10 will be described later.

The image forming apparatus 30 is an apparatus configured to execute printing of print data on paper by receiving print data to which a media file (such as the media file 211A) is applied from the user terminal 10. The image forming apparatus 30 includes an image forming section 31, which forms an image on paper, and a plurality of trays 32, each accommodating a different kind of paper. As the plurality of trays 32, for example, a first tray 32A and a second tray 32B are provided. Furthermore, the image forming apparatus 30 is equipped with a post-processing device 35, which performs post-processing such as folding of paper. The image forming apparatus 30 feeds the paper accommodated in the first tray 32A or the second tray 32B to the image forming section 31 using a feeder (not illustrated), and the image forming section 31 forms an image corresponding to the print data on the paper.

Based on a media file (such as the media file 211A), the image forming apparatus 30 uses the print setup items 222 at the time of printing in connection with the first tray 32A or the second tray 32B accommodating the paper corresponding to the paper information 221. In doing so, the image forming apparatus 30 reflects the information of the media file (such as the media file 211A) and forms an image corresponding to the print data on the paper.

For example, the image forming section 31 forms an image on paper using an electrophotographic system. The image forming section 31 includes, for example, an image forming unit configured to form an image on paper using toner of a plurality of colors, a transfer unit configured to transfer a toner image to the paper, and a fixing unit configured to fix the toner image transferred to the paper on the paper. Note that the image forming apparatus 30 may form an image corresponding to print data on paper using an inkjet system instead of an electrophotographic system.

Figure 6:
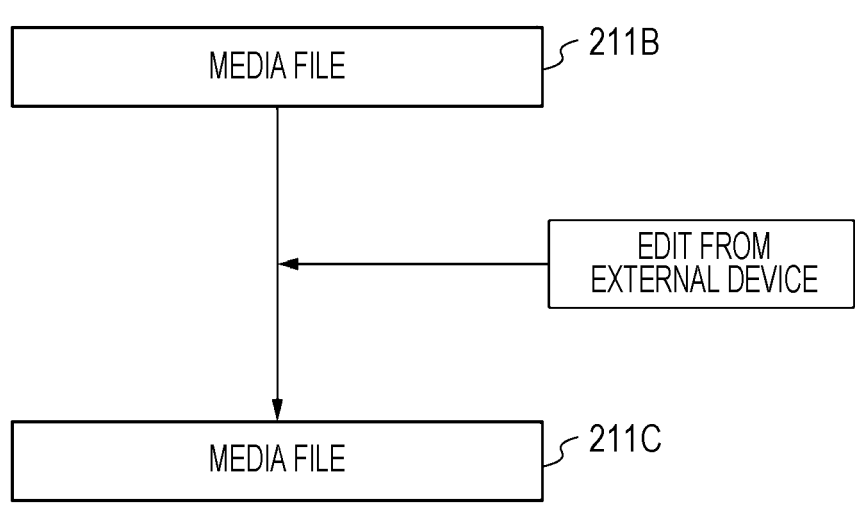
FIG. 6 is a diagram illustrating an example of editing a media file by using an external device.

The external device 40 is a device configured to edit a media file or the like. For example, the external device 40 is a personal computer (PC) used by a client as an example of a user. The external device 40 includes an input unit 41 and a display 42. For example, as illustrated in FIG. 6, the external device 40 may communicate with the user terminal 10 to read a media file 211B from a media file storage unit 101 (see FIG. 3) of the user terminal 10, and to display it on the display 42. The external device 40 is capable of editing the media file 211B using the input unit 41. An edited media file 211C is saved in the media file storage unit 101.

Figure 2:
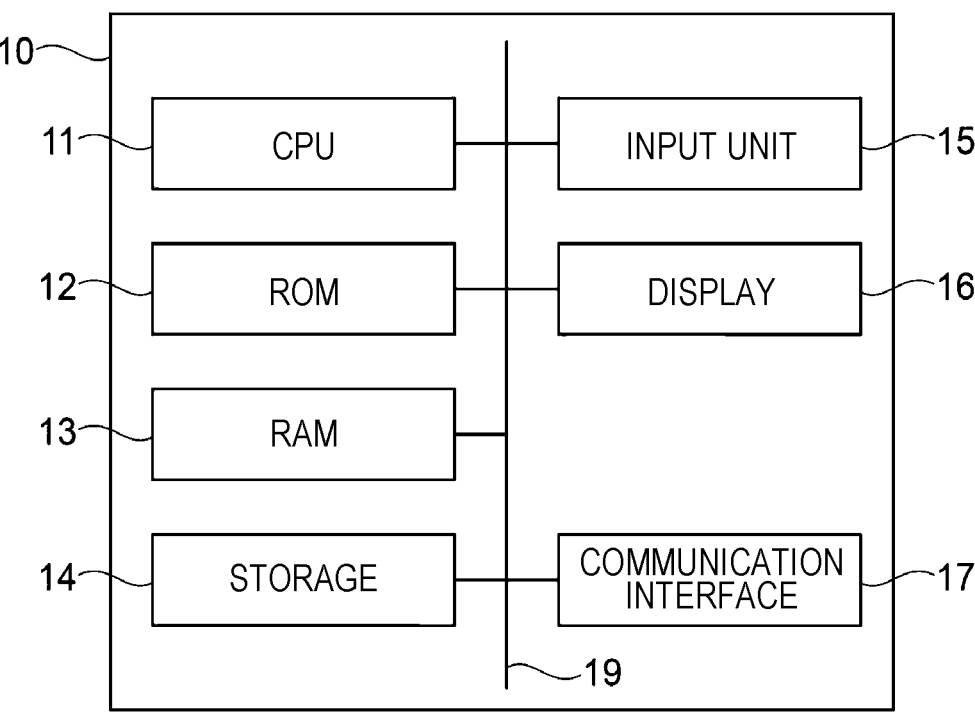
FIG. 2 is a block diagram illustrating the hardware configuration of the user terminal.

FIG. 2 is a block diagram illustrating the hardware configuration of the user terminal 10.

As illustrated in FIG. 2, the user terminal 10 includes the following configurations: a central processing unit (CPU)

11, a read-only memory (ROM) 12, a random-access memory (RAM) 13, a storage 14, a communication interface 17, the input unit 15, and the display 16. The configurations are communicatively connected to each other via a bus 19.

The CPU 11 is a central processing unit, which executes various programs and controls the individual parts. That is, the CPU 11 reads a program from the ROM 12 or the storage 14 and executes the program using the RAM 13 as a work area. In accordance with the program recorded in the ROM 12 or the storage 14, the CPU 11 controls the above configurations and performs various types of arithmetic processing. In the present exemplary embodiment, an information processing program is stored in the ROM 12 or the storage 14.

The ROM 12 stores various programs and various types of data. The RAM 13, as a work area, temporarily stores a program or data. The storage 14 includes a hard disk drive (HDD) or a solid state drive (SSD), and stores various programs including an operating system and various types of data. The storage 14 stores a printer driver program. The CPU 11 reads the printer driver program from the storage 14 and executes the program, thereby functioning as a printer driver.

The communication interface 17 is an interface for communicating with another device such as the image forming apparatus 30 or the external device 40, and a standard such as Ethernet (registered trademark), Fiber Distributed Data Interface (FDDI), or Wi-Fi (registered trademark) is used.

The input unit 15 includes a pointing device such as a mouse, and a keyboard, and is used to perform various types of entry.

The display 16 is, for example, a liquid crystal display, and displays various types of information. The display 16 may employ a touchscreen system to function also as the input unit 15.

Figure 3:
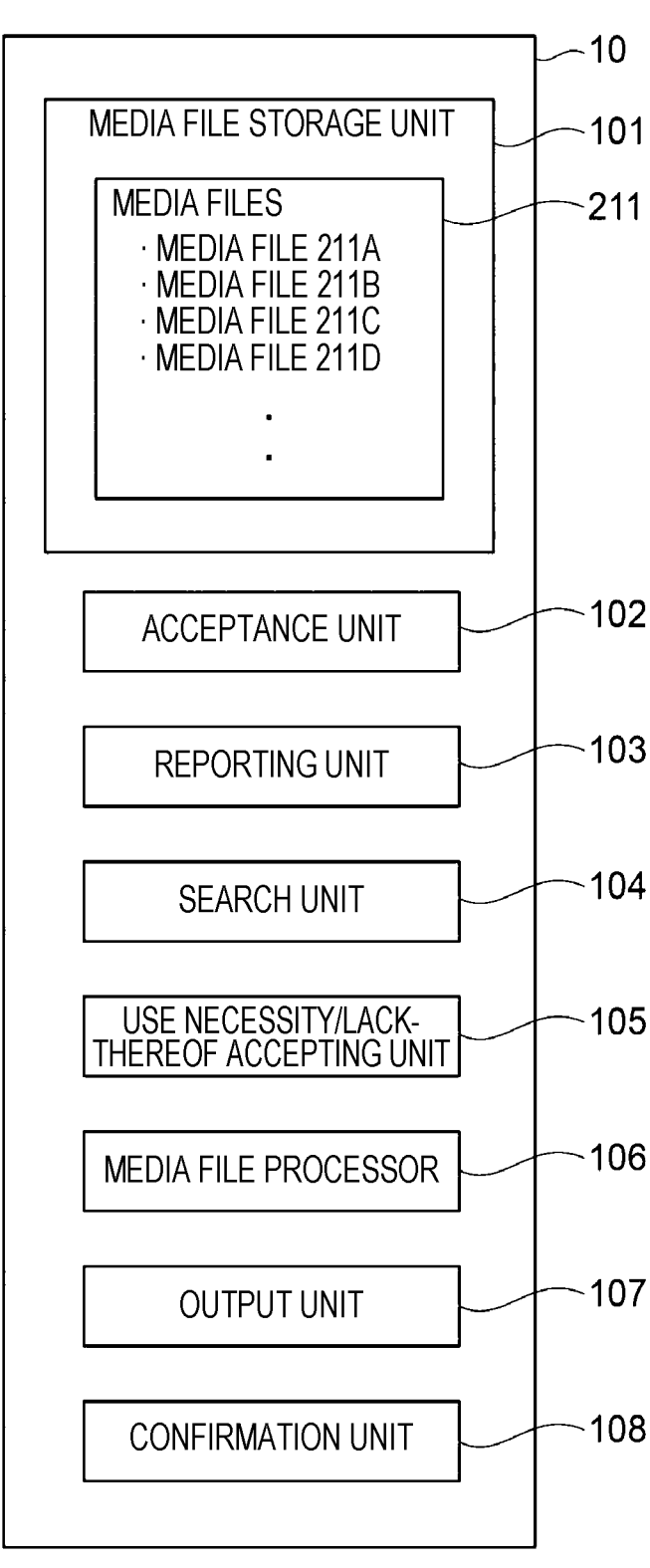
FIG. 3 is a block diagram illustrating an example of the functional configuration of the user terminal.

FIG. 3 is a block diagram illustrating an example of the functional configuration of the user terminal 10.

As illustrated in FIG. 3, the user terminal 10 includes, as functional configurations, the media file storage unit 101, an acceptance unit 102, a reporting unit 103, a search unit 104, a use necessity/lack-thereof accepting unit 105, a media file processor 106, an output unit 107, and a confirmation unit 108. The functional configurations are realized by reading, by the CPU 11, the information processing program stored in the ROM 12 or the storage 14, expanding the program in the RAM 13, and executing the program.

The media file storage unit 101 stores a plurality of media files 211. The plurality of media files 211 include, for example, the media file 211A, the media file 211B, and a media file 211D. Although omitted in the drawings, the media file storage unit 101 stores a large number of media files. For example, the media file storage unit 101 is constituted of the storage 14. The storage 14 may be a storage device connected externally to the user terminal 10.

Figure 4:
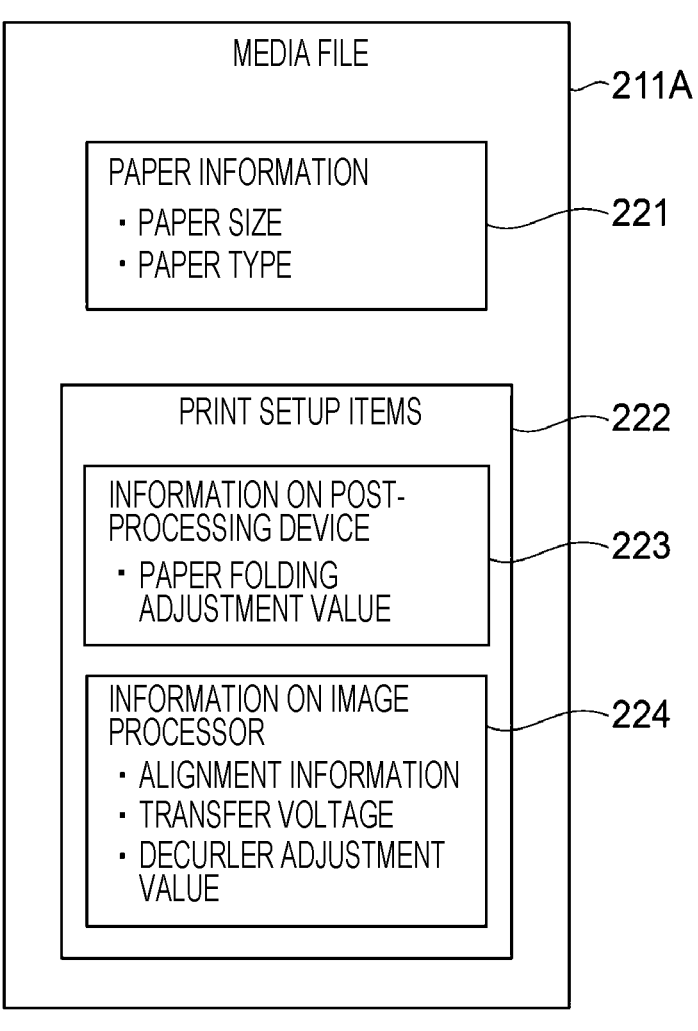
FIG. 4 is a diagram illustrating an example of a media file.

FIG. 4 illustrate an example of a media file.

As illustrated in FIG. 4, the media file 211A is information for print settings where the paper information 221 and the print setup items 222 are associated. The paper information 221 includes, for example, a paper size and a paper type. The paper type includes, for example, the presence or absence of a coating layer on the surface of the paper, and the type of the coating layer. At the time of printing, the image forming apparatus 30 allocates a tray (such as the first tray 32A or the second tray 32B) accommodating paper corresponding to the paper information 221. Note that the paper information 221 may include other paper information.

The print setup items 222 include information 223 on the post-processing device 35, and information 224 on an image processor in the image forming apparatus 30. The print setup item 222 includes image formation parameters for forming an image on paper and performing post-processing of the paper. The information 223 on the post-processing device 35 includes, for example, a paper folding adjustment value. The information 224 on the image processor includes, for example, alignment information, a transfer voltage, and a decurler adjustment value. The alignment information includes, for example, information on the arrangement of components of the image forming section 31. The transfer voltage includes, for example, a voltage setup value when transferring a toner image to an intermediate transfer body or paper. The decurler adjustment value includes, for example, an adjustment value of the pressing force of a member for decurling the paper. The print setup items 222 may include other print setup items. Moreover, the information 223 on the post-processing device 35 may include other post-processing information, and the information 224 on the image processor may include other parameters.

The user terminal 10 is capable of editing a media file stored in the media file storage unit 101. For example, one media file 211D stored in the media file storage unit 101 is read and edited, and as a result, an edited media file 211E is saved in the media file storage unit 101 (see FIG. 7). For example, the edited media file 211E is saved together with a time stamp in the media file storage unit 101. The time stamp is a character string indicating the date and time at which the media file 211E has been saved. Furthermore, the media file 211E stored in the media file storage unit 101 is read and edited, and as a result, an edited media file 211F is saved in the media file storage unit 101 (see FIG. 7).

The external device 40 is capable of reading one media file 211B from among a plurality of media files 211 stored in the media file storage unit 101, and editing the media file 211B (see FIG. 6). That is, using the external device 40, the client is capable of directly editing the media file 211B stored in the media file storage unit 101. For example, the media file 211C obtained by editing the media file 211B is saved in the media file storage unit 101. The edited media file 211C is saved together with a time stamp in the media file storage unit 101.

The acceptance unit 102 accepts the client's specification of one media file from among the plurality of media files 211, and the client's print instruction for print data. For example, using the input unit 15 of the user terminal 10, the client specifies one media file (such as the media file 211A) from among the plurality of media files 211, and gives a print instruction for print data.

The reporting unit 103 reports a media file as necessary. For example, in the case where the media file 211B is edited by the external device 40 and the edited media file 211C is saved in the media file storage unit 101 (see FIG. 6), the reporting unit 103 reports the edited media file 211C to the client. The reporting is done by displaying, for example, information of the edited media file 211C on the display 16.

The search unit 104 searches for the presence of a preferred media file that is another media file associated with the same paper as the paper associated with the specified media file, and that has a higher preference than the specified media file. For example, in the case where the media file 211D is specified, the search unit 104 searches for the presence of a preferred media file that is another media file 211E or 211F associated with the same paper as the paper associated with the media file 211D and that has a higher preference than the media file 211D (see FIG. 7). For example, the search unit 104 searches for the presence of a preferred media file having a higher preference than the media file 211D based on the number of edits, the frequency of use, or the newness of the time stamp of each of the media files 211E and 211F. The degree or the order of preference of preferred media files is determined in advance based on the number of edits, the frequency of use, the newness of the time stamp, or the like of each media file.

The use necessity/lack-thereof accepting unit 105 accepts the necessity or lack thereof to use a preferred media file. For example, in the case where there is a preferred media file (such as the media file 211E or the media file 211F) having a higher preference than the specified media file 211D, the preferred media file is displayed on the display 16 of the user terminal 10. The necessity or lack thereof to use the preferred media file (such as the media file 211F) is entered using the input unit 15 of the user terminal 10, thereby allowing the use necessity/lack-thereof accepting unit 105 to accept the necessity or lack thereof to use the preferred media file.

In the case where there are plural preferred media files each having a higher preference than the specified media file, the use necessity/lack-thereof accepting unit 105 may accept the necessity or lack thereof to use a preferred media file having the highest preference. For example, in the case where there are plural preferred media files (such as the media files 211E and 211F) each having a higher preference than the specified media file 211D (see FIG. 7), the use necessity/lack-thereof accepting unit 105 may accept whether to use a preferred media file (such as the media file 211F) having the highest preference.

The preferred media file having the highest preference is, for example, a media file having the largest number of edits in the print setup items 222 (FIG. 4) among other media files associated with the same paper as the paper associated with the specified media file.

The preferred media file having the highest preference is, for example, a media file having the highest frequency of use among other media files associated with the same paper as the paper associated with the specified media file. The preferred media file having the highest preference is determined in advance based on the number of edits and the time stamp.

Figure 7:
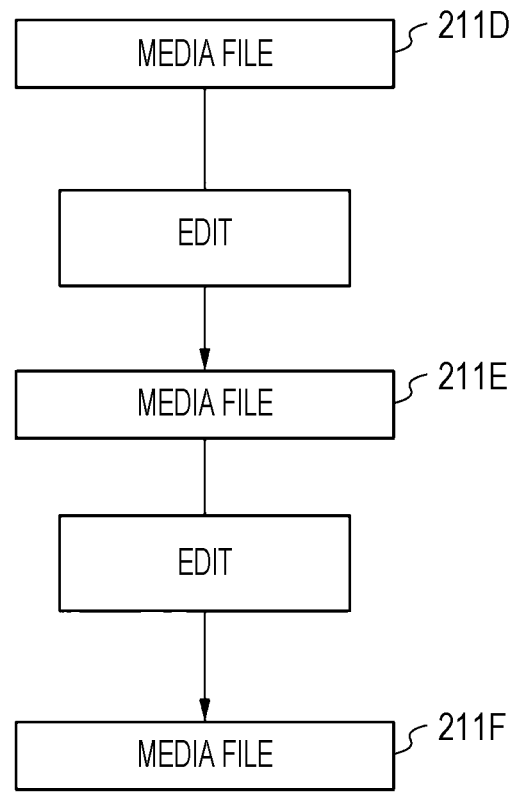
FIG. 7 is a diagram illustrating an example of editing a media file on the user terminal.

The media file processor 106 performs processing such as editing of media files and switching of media files. For example, as illustrated in FIG. 7, when the media file 211D is specified, if the use necessity/lack-thereof accepting unit 105 accepts the use of a preferred media file (such as the media file 211F), the media file processor 106 perform processing to switch the specified media file 211D to the preferred media file.

The output unit 107 outputs print data to which a media file is applied. For example, in the case where the use necessity/lack-thereof accepting unit 105 accepts the use of a preferred media file (such as the media file 211F), the output unit 107 outputs print data to which the preferred media file is applied. Moreover, in the case where the use necessity/lack-thereof accepting unit 105 does not accept the use of a preferred media file, the output unit 107 may output print data to which a media file specified by the client (such as the media file 211D) is applied.

Moreover, in the case where one media file 211A specified by the client has not been updated since the previous use, the output unit 107 outputs print data to which the media file 211A is applied. That is, the output unit 107 outputs print data to which the media file 211A is applied, without having the use necessity/lack-thereof accepting unit 105 inquire about the necessity or lack thereof to use a preferred media file. In this case, the use necessity/lack-thereof accepting unit 105 does not accept the necessity or lack thereof to use a preferred media file.

In the case where the use of a preferred media file is not accepted and there has been no actual printing to which one media file specified by the client is applied, the confirmation unit 108 asks the client whether to restore an unedited media file corresponding to the specified media file. In doing so, the necessity or lack thereof to restore an unedited media file corresponding to the specified media file is accepted. Restoration refers to returning a media file to its original form. For example, when the media file 211E (see FIG. 7) is specified by the client, if there has been no actual printing to which the specified media file 211E is applied, the confirmation unit 108 displays, on the display 16 of the user terminal 10, whether to restore the unedited media file 211D (see FIG. 7) corresponding to the media file 211E.

Next, the operation of the information processing system 1 including the user terminal 10 will be described.

Figure 5:
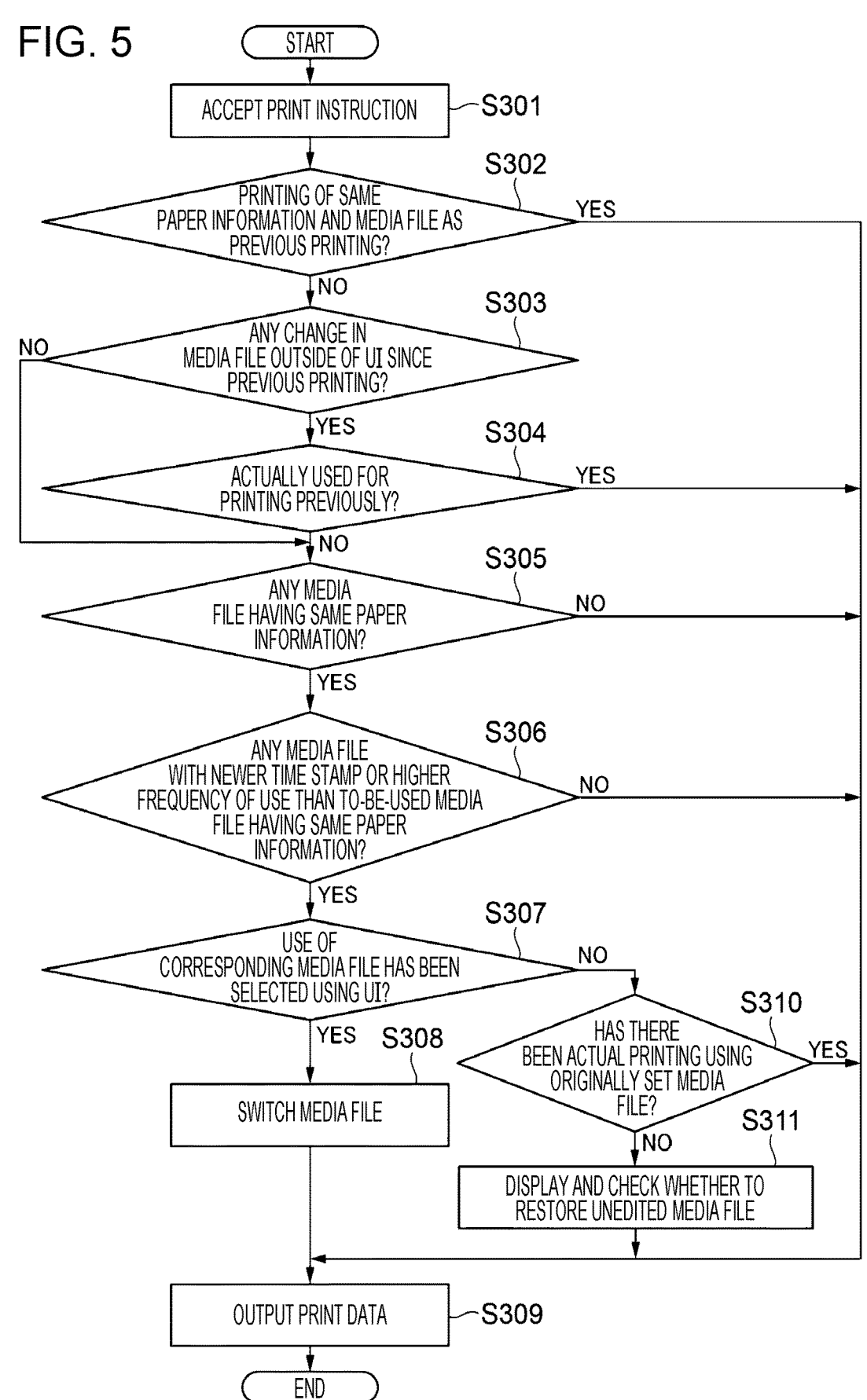
FIG. 5 is a flowchart illustrating the flow of processing of the user terminal according to the first exemplary embodiment.

FIG. 5 is a flowchart illustrating the flow of information processing performed by the user terminal 10 of the information processing system 1. The information processing is performed when the CPU 11 reads the information processing program from the ROM 12 or the storage 14, expands the program in the RAM 13, and executes the program.

Before the information processing illustrated in FIG. 5 is executed, the client specifies in advance one media file from among the plurality of media files 211 on the user terminal 10, and gives a print instruction for print data.

The CPU 11 accepts the specification of the media file, and the print instruction for print data (step S301). For example, in the case where the media file 211A is specified, if the paper accommodated in the first tray 32A or the second tray 32B of the image forming apparatus 30 and the paper information 221 of the media file 211A match, the CPU 11 accepts the specification of the media file 211A and the print instruction for print data.

Although omitted in the drawings, if there is a mismatch between the paper accommodated in the first tray 32A or the second tray 32B of the image forming apparatus 30 and the setting of the media file 211A, the CPU 11 sends error information indicating that there is an error in the paper setting to the user terminal 10. A mismatch refers to the case where there is an error in the combination of the paper accommodated in the first tray 32A or the second tray 32B of the image forming apparatus 30 and the paper information 221 of the media file 211A. For example, the CPU 11 of the user terminal 10 displays the error information on the display 16.

The CPU 11 determines whether it is printing of the same paper information 221 and the same media file as the previous printing (step S302). Specifically, the CPU 11 determines whether the combination of the paper and the media file 211A used in the previous printing and the combination of the paper and the media file 211A with which printing is to be performed this time are the same.

In the case where it is printing of the same paper information 221 and the same media file as the previous printing (YES in step S302), the CPU 11 proceeds to the processing in step S309. For example, in the case where it is printing of the same print information 221 and the same media file 211A as the previous printing, the CPU 11 outputs the print data to which the media file 211A is applied to the image forming apparatus 30 (step S309). In the case where the combination of the paper and the media file 211A used in the previous printing and the combination of the paper and the media file

211A with which printing is to be performed this time are the same, the combination has been actually used for printing previously, and therefore the image forming apparatus 30 executes printing. In doing so, the image forming apparatus 30 executes printing of the print data using the combination of the paper and the media file 211A that are originally specified.

In the case where it is not printing of the same paper information 221 and the same media file as the previous printing (NO in step S302), the CPU 11 determines whether there has been a change in the media file outside of the user interface (UI) since the previous printing (step S303). Here, the UI refers to an operation screen and/or an operation method of the device and/or software that the user interacts when exchanging information with a computer. In the first exemplary embodiment, when a media file is edited and saved using the external device 40, which is outside of the UI of the user terminal 10, the CPU 11 determines that there has been a change in the media file outside of the UI.

For example, as illustrated in FIG. 6, the client may edit the media file 211B using the external device 40, and the edited media file 211C may be saved in the media file storage unit 101. In such a case, if the media file 211B is specified and a print instruction is given on the user terminal 10, the specified media file 211B is different from the edited media file 211C. In the first exemplary embodiment, the following processing is performed to enable printing using a media file having a higher preference than the media file 211B specified by the client.

In the case where there has been a change in the media file outside of the UI since the previous printing (YES in step S303), the CPU 11 determines whether the originally set combination has been actually used for printing previously (step S304). For example, in the case where there has been a change in the media file using the external device 40 since the previous printing, the CPU 11 determines whether the combination of the paper and the media file 211B that are originally set has been used for printing previously.

In the case where the originally set combination has been actually used for printing previously (YES in step S304), the CPU 11 proceeds to the processing in step S309. For example, in the case where the media file 211B has been actually used for printing previously, the CPU 11 outputs the print data to which the media file 211B is applied to the image forming apparatus 30 (step S309). In doing so, the image forming apparatus 30 executes printing of the print data using the combination of the paper and the media file 211B that are originally set.

In the case where the originally set combination has not been actually used for printing previously (NO in step S304), the CPU 11 determines whether there is another media file having the same paper information 221 (step S305).

In the case where there has been no change in the media file 211B outside of the user interface (UI) since the previous printing (NO in step S303), the CPU 11 determines whether there is another media file having the same paper information 221 (step S305).

For example, as illustrated in FIG. 7, the client may accidentally select the old media file 211D from among the plurality of media files 211. After that, the client may specify the media file 211D and give a print instruction on the user terminal 10. In the first exemplary embodiment, in such a case, processing is performed to enable printing using a media file having a higher preference than the media file 211D specified by the client.

In the case where there has been no other media file having the same paper information 221 (NO in step S305), the CPU 11 proceeds to the processing in step S309. In this case, the CPU 11 outputs the print data to which the specified media file is applied to the image forming apparatus 30 (step S309).

In the case where there has been another media file having the same paper information 221 (YES in step S305), the CPU 11 determines whether there is a media file with a newer time stamp or a higher frequency of use than the to-be-used media file having the same paper information 221 (step S306). For example, as illustrated in FIG. 7, in the case where the old media file 211D is specified, it is determined that there is a media file (such as the media file 211F) with a newer time stamp or a higher frequency of use than the to-be-used media file 211D having the same paper information 221. That is, the media file 211F is a preferred media file having a higher preference.

For example, as illustrated in FIG. 6, in the case where the media file 211B is specified, it is determined that there is a media file (such as the media file 211C) with a newer time stamp or a higher frequency of use than the to-be-used media file 211B having the same paper information 221. That is, the media file 211C is a preferred media file having a higher preference.

In the case where there is no media file with a newer time stamp or a higher frequency of use than the to-be-used media file having the same paper information 221 (NO in step S306), the CPU 11 proceeds to the processing in step S309. That is, the CPU 11 outputs the print data to which the specified media file is applied to the image forming apparatus 30 (step S309).

In the case where there is a media file with a newer time stamp or a higher frequency of use than the to-be-used media file having the same paper information 221 (YES in step S306), the CPU 11 determines whether the use of the corresponding media file has been selected using the UI (step S307).

For example, as illustrated in FIG. 6, this is the case when there is a media file (such as the media file 211C) with a newer time stamp or a higher frequency of use than the to-be-used media file 211B having the same paper information 221. In this case, a selection screen for selecting whether to use the corresponding media file 211C is displayed on the display 16 of the user terminal 10, thereby checking whether to use the corresponding media file 211C. In doing so, the CPU 11 accepts the necessity or lack thereof to use the preferred media file.

Alternatively, for example, as illustrated in FIG. 7, this is the case when there is a media file (such as the media file 211E or 211F) with a newer time stamp or a higher frequency of use than the to-be-used media file 211D having the same paper information 221. In this case, a selection screen for selecting whether to use the corresponding media file 211E or 211F is displayed on the display 16 of the user terminal 10, thereby checking whether to use the corresponding media file 211E or 211F. In doing so, the CPU 11 accepts the necessity or lack thereof to use the preferred media file.

Moreover, in the case where there are plural preferred media files (the media files 211E and 211F) each having a higher preference than the specified media file 211D, the CPU 11 may accept the necessity or lack thereof to use the preferred media file (the media file 211F) having the highest preference. The preference of the preferred media files is set in advance in accordance with the number of edits, the frequency of use, and the time stamp of each media file.

Alternatively, the CPU 11 may display a selection screen on which the preferred media files are arranged in the descending order of preference in accordance with the number of edits, the frequency of use, and the time stamp of each media file, thereby allowing the client to select which preferred media file to use.

In the case where the use of the corresponding media file is selected using the UI (YES in step S307), the CPU 11 switches the media file (step S308). For example, as illustrated in FIG. 6, this is the case when, in the case where the use of the corresponding media file 211C is selected, the use of the preferred media file is accepted. For example, in the case where the use of the corresponding media file 211C is selected, the CPU 11 switches the originally specified media file 211B to the media file 211C.

Furthermore, for example, as illustrated in FIG. 7, this is the case when, in the case where the use of the corresponding media file 211F is selected, the use of the preferred media file is accepted. For example, in the case where the use of the corresponding media file 211F is selected, the CPU 11 switches the originally specified media file 211D to the media file 211F.

The CPU 11 outputs the print data to which the media file is applied (step S309). For example, in the case where media file is switched in step S308, the CPU 11 outputs the print data to which the switched media file is applied.

In the case where the use of the corresponding media file is not selected using the UI (NO in step S307), the CPU 11 determines whether there has been actual printing using the originally set media file (step S310). For example, as illustrated in FIG. 6, in the case where the corresponding media file 211C is not selected, the CPU 11 determines whether there has been actual printing using the originally set media file 211B.

In the case where there has been actual printing using the originally set media file (YES in step S310), the CPU 11 outputs the print data to which the originally set media file is applied to the image forming apparatus 30 (step S309). For example, as illustrated in FIG. 6, in the case where there has been actual printing using the original media file 211B, printing of the print data to which the original media file 211B is applied is performed.

In the case where there has been no actual printing using the originally set media file (NO in step S310), the CPU 11 displays and checks whether to restore an unedited media file corresponding to the originally set media file (step S311). For example, as illustrated in FIG. 7, in the case where the media file 211E is originally set, and there has been no actual printing using the media file 211E, a confirmation screen is displayed on the display 16 of the user terminal 10 as to whether to restore the unedited media file 211D corresponding to the media file 211E. Although omitted in the drawings, in the case of restoring an unedited media file, the CPU 11 creates the temporary media file 211D from the log, and uses this media file 211D for printing. The log refers to the history or the record of information on computer usage and data communication. That is, the CPU 11 outputs the print data to which the restored corresponding media file is applied to the image forming apparatus 30 (step S309).

Although omitted in the drawings, in the case of not restoring an unedited media file, the CPU 11 outputs the print data to which the originally set media file is applied to the image forming apparatus 30 (step S309). For example, in the case where the media file 211E is originally set, and an unedited media file corresponding to the media file 211E is not to be restored, the CPU 11 outputs the print data to which the originally set media file 211E is applied to the image forming apparatus 30. In doing so, the processing based on the information processing program ends.

Accordingly, in the case where there are a large number of media files, the user terminal 10 and the information processing program may enable printing using a media file having a higher preference than a media file specified by the user.

In general, it is difficult to specify (e.g., select) the optimal media file when there are a large number of media files. In addition, a media file may be changed in places other than the UI, and, in that case, a wrong media file different from the one set using the UI may be specified. Also, for example, the user may have specified a previously-used media file, but a media file with better adjustment results may have been created since then. For example, the optimal media file may become different afterwards, such as when another media file with settings changed from the settings done using the UI is better. As described above, there are cases where the media file was appropriate at the time of setting up the media file, but the media file is not optimal at the time of printing.

In the case where there is a preferred media file that is another media file associated with the same paper as the paper associated with a specified media file and that has a higher preference than the specified media file, the user terminal 10 of the first exemplary embodiment accepts the necessity or lack thereof to use the preferred media file. Accordingly, in the case where there are a large number of media files, the user terminal 10 may enable printing using a media file having a higher preference than a media file specified by the user.

Moreover, in the user terminal 10, in the case where there are plural preferred media files each having a higher preference than a specified media file, the CPU 11 accepts the necessity or lack thereof to use a preferred media file having the highest preference. Accordingly, in the case where there are plural preferred media files each having a higher preference, the user terminal 10 may enable printing using a preferred media file having the highest preference.

In addition, in the user terminal 10, the preferred media file having the highest preference is, among other media files, a media file with the largest number of edits in the print setup items 222. Accordingly, the user terminal 10 may enable printing using setup information whose number of edits in the print setup items 222 is the largest.

Moreover, in the user terminal 10, the preferred media file having the highest preference is, among other media files, a media file with the highest frequency of use. Accordingly, the user terminal 10 may enable printing using a media file having the highest frequency of use.

In the user terminal 10, if the CPU 11 does not accept the use of a preferred media file (such as the media file 211C), the CPU 11 outputs print data to which one media file (such as the media file 211B) specified by the user is applied. Accordingly, in the case where the use of a preferred media file is not accepted, the user terminal 10 may enable printing using one media file specified by the user.

In the user terminal 10, if the CPU 11 does not accept the use of a preferred media file (such as the media file 211F) and there has been no actual printing to which one media file (such as the media file 211E) is applied, the user is asked whether to restore an unedited media file (such as the media file 211D) corresponding to the media file (such as the media file 211E). Accordingly, in the case where there has been no actual printing to which one media file (such as the media file 211E) is applied, the user terminal 10 may enable restoration of an unedited media file (such as the media file 211D) corresponding to the media file (such as the media file 211E) and the use of it for printing.

In addition, in the user terminal 10, in the case where one media file (such as the media file 211A) specified by the user has not been updated since the previous use, the CPU 11 outputs print data to which the media file (such as the media file 211A) is applied, without accepting the necessity or lack thereof to use a preferred media file. Accordingly, the user terminal 10 may enable quick printing using one media file (such as the media file 211A), as compared to the case where the necessity or lack thereof to use a preferred media file is accepted when one media file has not been updated since the previous use.

Others

Although the user terminal 10 and the image forming apparatus 30 are wirelessly connected in the first exemplary embodiment described above, the present disclosure is not limited to this configuration. For example, an image forming apparatus may include an information processing device including a processor, and an image forming section configured to form an image on a recording medium based on print data output by the information processing device.

Although the user terminal 10 and the image forming apparatus 30 are wirelessly connected and the user terminal 10 and the external device 40 are wirelessly connected in the first exemplary embodiment described above, the present disclosure is not limited to this configuration. For example, the user terminal 10 and the external device 40 or the user terminal 10 and the image forming apparatus 30 may be connected wirelessly or wired via a server as a relay unit. In addition, a server as an example of an information processing device of the present disclosure may be provided.

In the first exemplary embodiment described above, processing of the user terminal 10 and the image forming apparatus 30 may be realized by a dedicated hardware circuit. In this case, the processing may be executed by one piece of hardware or plural pieces of hardware.

Moreover, a program for operating the user terminal 10 and the image forming apparatus 30 may be provided by a computer-readable recording medium such as a Universal Serial Bus (USB) memory, a flexible disk, or a Compact Disc Read Only Memory (CD-ROM), or may be provided online via a network such as the Internet. In this case, the program recorded on the computer-readable recording medium is usually transferred to a memory or storage and stored. This program may be provided as a single independent piece of application software, for example, or may be incorporated into the software of each device as a function of the user terminal 10 or the image forming apparatus 30.

Although the present disclosure has been described in detail with respect to the specific exemplary embodiment, the present disclosure is not limited to the exemplary embodiment, and it is clear to those skilled in the art that various other embodiments are possible within the scope of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))))

An information processing device including:

at least one processor, the processor configured to:
accept a user's specification of one item of setup information from among a plurality of items of setup information associated with a recording medium and a print setup item;
in a case where there is preferred setup information that is another item of setup information associated with a same recording medium as a recording medium associated with the specified setup information, and that has a higher preference than the specified setup information, accept necessity or lack thereof to use the preferred setup information; and
upon acceptance of use of the preferred setup information, output print data to which the preferred setup information is applied.

(((2)))

The information processing device according to (((1))), wherein the processor is configured to, in a case where there is a plurality of items of preferred setup information each having a higher preference than the specified setup information, accept necessity or lack thereof to use preferred setup information having a highest preference.

(((3)))

The information processing device according to (((2))), wherein the preferred setup information having the highest preference is, among other items of setup information, setup information whose number of edits in the print setup item is largest.

(((4)))

The information processing device according to (((2))), wherein the preferred setup information having the highest preference is, among other items of setup information, setup information with a highest frequency of use.

(((5)))

The information processing device according to any one of (((1)))) to (((4))), wherein the processor is configured to, in a case where use of the preferred setup information is not accepted, output print data to which the setup information specified by the user is applied.

(((6)))

The information processing device according to any one of (((2))) to (((4))), wherein the processor is configured to, in a case where use of the preferred setup information is not accepted, and there has been no actual printing to which the setup information is applied, accept necessity or lack thereof to restore unedited setup information corresponding to the setup information.

(((7)))

The information processing device according to any one of (((1))) to (((6))), wherein the processor is configured to, in a case where the setup information specified by the user has not been updated since previous use, output print data to which the setup information is applied, without accepting necessity or lack thereof to use the preferred setup information.

(((8)))

An image forming apparatus including:

the information processing device according to any one of (((1))) to (((7))); and an image forming section configured to form an image on a recording medium based on print data output by the information processing device.

(((9)))

A program causing a computer to execute a process, the process including:

accepting a user's specification of one item of setup information from among a plurality of items of setup information associated with a recording medium and a print setup item;

in a case where there is preferred setup information that is another item of setup information associated with a same recording medium as a recording medium associated with the specified setup information, and that has a higher preference than the specified setup information, accepting necessity or lack thereof to use the preferred setup information; and upon acceptance of use of the preferred setup information, outputting print data to which the preferred setup information is applied.

What is claimed is:

1. An information processing device comprising:

at least one processor, the processor configured to:

accept a user's specification of one item of setup information from among a plurality of items of setup information associated with a recording medium and a print setup item;

determine whether the specified setup information and the recording medium associated with the specified setup information are the same as setup information and a recording medium used in a previous printing;

in a case where the setup information specified by the user and the recording medium associated with the specified setup information are determined to be the same as the setup information and the recording medium used in the previous printing, output print data to which the setup information is applied, without accepting necessity or lack thereof to use preferred setup information;

in a case where there is the preferred setup information that is another item of setup information associated with a same recording medium as a recording medium associated with the specified setup information, and that has a higher preference than the specified setup information, accept necessity or lack thereof to use the preferred setup information; and upon acceptance of use of the preferred setup information, output print data to which the preferred setup information is applied.

2. The information processing device according to claim 1, wherein the processor is configured to, in a case where there is a plurality of items of preferred setup information each having a higher preference than the specified setup information, accept necessity or lack thereof to use preferred setup information having a highest preference.

3. The information processing device according to claim 2, wherein the preferred setup information having the highest preference is, among other items of setup information, setup information whose number of edits in the print setup item is largest.

4. The information processing device according to claim 2, wherein the preferred setup information having the highest preference is, among other items of setup information, setup information with a highest frequency of use.

5. The information processing device according to claim 1, wherein the processor is configured to, in a case where use of the preferred setup information is not accepted, output print data to which the setup information specified by the user is applied.

6. The information processing device according to claim 2, wherein the processor is configured to, in a case where use of the preferred setup information is not accepted, and there has been no actual printing to which the setup information is applied, accept necessity or lack thereof to restore unedited setup information corresponding to the setup information.

7. An image forming apparatus comprising:
the information processing device according to claim 1; and
an image forming section configured to form an image on a recording medium based on print data output by the information processing device.

8. An image forming apparatus comprising:
the information processing device according to claim 2; and
an image forming section configured to form an image on a recording medium based on print data output by the information processing device.

9. An image forming apparatus comprising:
the information processing device according to claim 3; and
an image forming section configured to form an image on a recording medium based on print data output by the information processing device.

10. An image forming apparatus comprising:
the information processing device according to claim 4; and
an image forming section configured to form an image on a recording medium based on print data output by the information processing device.

11. An image forming apparatus comprising:
the information processing device according to claim 5; and
an image forming section configured to form an image on a recording medium based on print data output by the information processing device.

12. An image forming apparatus comprising:
the information processing device according to claim 6; and an image forming section configured to form an image on a recording medium based on print data output by the information processing device.

13. A non-transitory computer readable medium storing an information processing program causing a computer to execute a process, the process comprising:
accepting a user's specification of one item of setup information from among a plurality of items of setup information associated with a recording medium and a print setup item;
determining whether the specified setup information and the recording medium associated with the specified setup information are the same as setup information and a recording medium used in a previous printing;
in a case where the setup information specified by the user and the recording medium associated with the specified setup information are determined to be the same as the setup information and the recording medium used in the previous printing, outputting print data to which the setup information is applied, without accepting necessity or lack thereof to use preferred setup information;
in a case where there is the preferred setup information that is another item of setup information associated with a same recording medium as a recording medium associated with the specified setup information, and that has a higher preference than the specified setup information, accepting necessity or lack thereof to use the preferred setup information; and
upon acceptance of use of the preferred setup information, outputting print data to which the preferred setup information is applied.

14. An information processing method for a computer to execute a process, the process comprising:
accepting a user's specification of one item of setup information from among a plurality of items of setup information associated with a recording medium and a print setup item;
determining whether the specified setup information and the recording medium associated with the specified setup information are the same as setup information and a recording medium used in a previous printing;
in a case where the setup information specified by the user and the recording medium associated with the specified setup information are determined to be the same as the setup information and the recording medium used in the previous printing, outputting print data to which the setup information is applied, without accepting necessity or lack thereof to use preferred setup information;
in a case where there is the preferred setup information that is another item of setup information associated with a same recording medium as a recording medium associated with the specified setup information, and that has a higher preference than the specified setup information, accepting necessity or lack thereof to use the preferred setup information; and
upon acceptance of use of the preferred setup information, outputting print data to which the preferred setup information is applied.

* * * * *